UNITED STATES PATENT OFFICE.

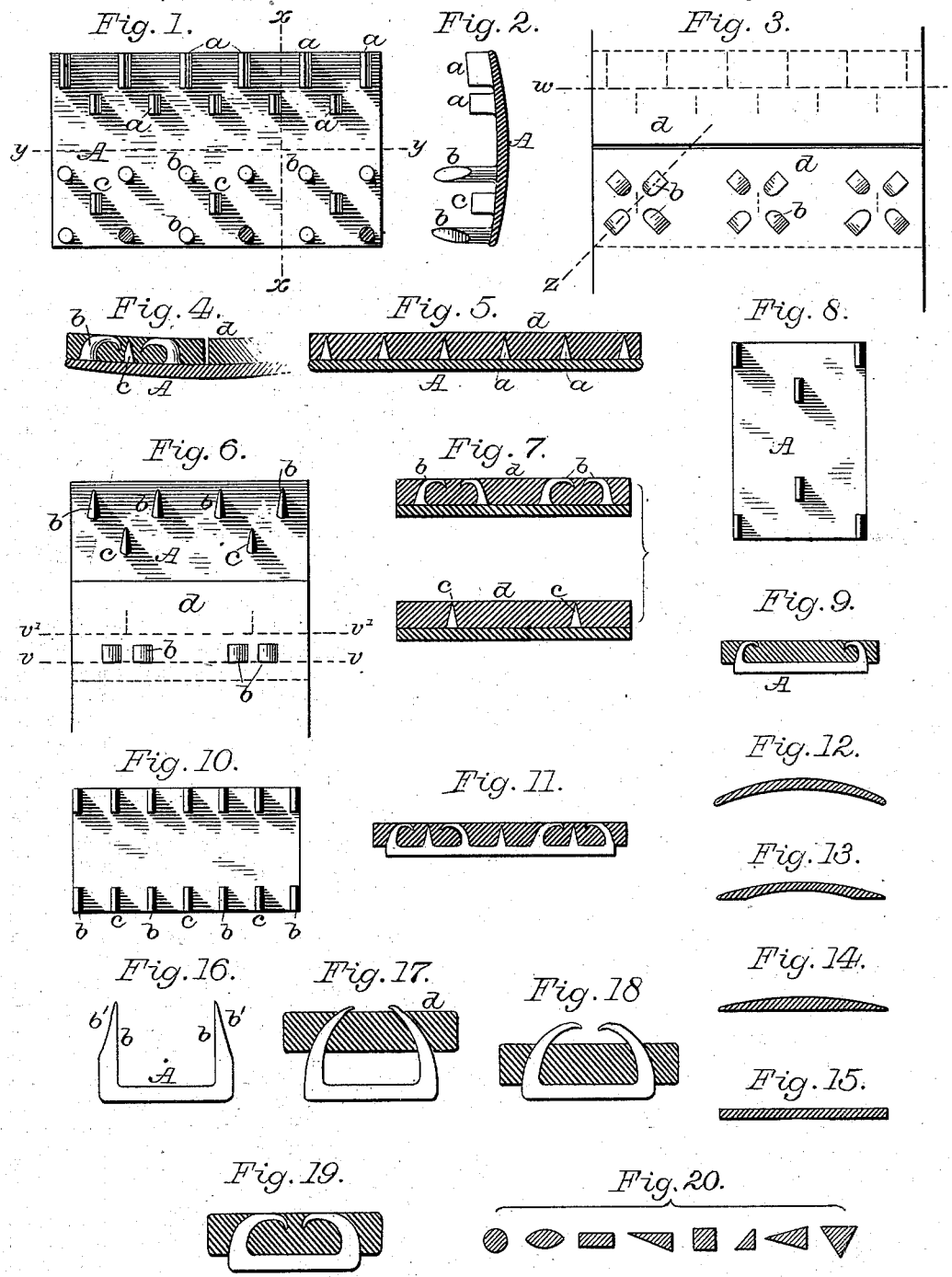

SIMEON BUDLONG AND WALTER O. TALCOTT, OF PROVIDENCE, R. I.

BELT-FASTENER.

SPECIFICATION forming part of Letters Patent No. 278,393, dated May 29, 1883.

Application filed January 22, 1883. (No model.)

*To all whom it may concern:*

Be it known that we, SIMEON BUDLONG and WALTER O. TALCOTT, both of the city and county of Providence, in the State of Rhode Island, have invented certain new and useful Improvements in Belt-Fasteners; and we do hereby declare that the following specification, taken in connection with the drawings furnished, and forming a part of the same, is a clear, true, and complete description of the several features of our invention.

Our said improvements relate to that class of belt-fasteners which embody a plate and puncturing-teeth, disclosed in the United States Letters Patent No. 84,925, issued to F. G. Wilson, December 15, 1868, under which we have manufactured for many years. Our improved fasteners are in no sense limited to any particular form of plate, and the teeth may, in addition to our present improvements, involve the use of certain prior improvements in barbed teeth made by us, and disclosed in our Letters Patent No. 205,610, July 2, 1878, and No. 216,827, June 24, 1879. We employ in our improved fasteners puncturing-teeth which are unequally beveled at their points, as duly set forth and claimed in Letters Patent No. 215,567, issued to us May 20, 1879.

One object of our present invention is to provide against the accidental detachment of the fastener from the belt, and yet to enable it to be easily detached intentionally from one end of the belt, and therefore we provide a series of clinchable teeth from one end of the belt, and on the same plate a series of non-clinchable teeth for the other end of the belt.

Another object of our invention is to condense the portions of the belt which are embraced or located substantially between any two clinchable teeth which incline toward each other, and this we accomplish by the use of a non-clinchable tooth between said clinchable teeth. To obviate an undue metallic surface on the pulley side of the belt, without lack of tensile strength of connection, we employ non-clinchable teeth which are shorter than the clinchable teeth and shorter than the thickness of the belt.

Another object of our invention is to cause considerable portions of the belt to be condensed and firmly embraced between the teeth, and therefore we arrange the clinchable teeth in groups, and bevel their points on the sides farthest from the center of the group, so that when driven into a belt said points are inclined toward each other, and when clinched they are made to occupy or lie upon the portion of the belt which is surrounded by said group of teeth.

It is desirable in most cases to provide for the return of the points of clinchable teeth toward the plate, and to thereby completely house said points in the belt, and this we deem a novel feature in applying belt-fasteners having puncturing-teeth, although clasps have heretofore been used having arms with points on one side thereof, so that when said arms are bent over upon a belt said points are forced therein. We accomplish the end stated by providing the clinchable teeth with slender puncturing-points unequally beveled on one side, whereby when driven into a belt they are inclined to the side opposite the bevel, and when the protruding points are struck with a hammer their sharp slender points are turned downward and caused to re-enter the belt in clinching.

All of the separate features of invention may be embodied in one belt-fastener, or each feature may be separately employed, and for a more complete description thereof we will refer to the accompanying drawings, in which—

Figure 1 is a plan view of one of our improved fasteners, which embodies all of the several features of our invention. Fig. 2 is a sectional view of the fastener, Fig. 1, on line *x*. Fig. 3 is a view of the same applied to a belt as viewed from the pulley side thereof. Figs. 4 and 5 are sectional views of Fig. 3, respectively, on diagonal line *z* and lateral line *w*. Figs. 6 to 11 are various views of fasteners embodying more or less of the several features of our invention. Figs. 12 to 15 are sectional views of the various types of plates which we employ in our fasteners. Fig. 16 is a side view of a pair of our novel clinchable teeth enlarged. Fig. 17 is a view of the same as it appears when forced nearly through a belt. Fig. 18 is a view of the same when fully forced through a belt. Fig. 19 is a view of the same when clinched. Fig. 20 illustrates in cross-section several types of teeth used by us.

We will first describe the belt-fastener illustrated in Figs. 1 to 5, which contains all of the several features of our invention.

It is to be understood that the plate A is shaped and proportioned in each case so as to adapt it to the particular variety of belt on which it is to be used, or character of service in which it is to be employed, and in Figs. 12 to 15 we have shown sectional views of various types of plate employed by us.

The dotted line $y$ in Fig. 1 indicates the joint line between the abutting ends of a belt, and it will be seen that the teeth on one side of said line differ from those on the other in that the teeth of one set are clinchable with occasional non-clinchable teeth and the other set are non-clinchable.

The non-clinchable teeth $a$ need herein no special description, for we use many of the well-known types of teeth of that class, especially such as are shown and described in our prior Letters Patent, including such as have barbs thereon.

Although we have shown a special variety of clinchable teeth devised by us, it is to be understood that any well-known type of clinchable teeth can be employed in connection with non-clinchable teeth on the same plate in accordance with certain features of our invention. The clinchable teeth $b$, as clearly indicated, have puncturing-points, and are of such length and are so proportioned that they pass through a belt, and when hammered bend over and downward and insert their points or tips into the belt. It will be seen that they are arranged in groups of four in each group, and that the clinched ends extend toward the center of the group, as illustrated in Fig. 3. This uniform inward bending of the teeth is occasioned by an excessive or unequal bevel or incline on one side of the point, as set forth and claimed in one of our aforesaid Letters Patent, No. 215,567. It will also be seen that in the center of each group there is a shorter non-clinchable tooth, $c$, which does not project through the belt $d$, but serves to secure a condensation of that portion of the belt which is surrounded by each group of teeth, and it also adds to the tensile union of the belt and fastener. The non-clinchable teeth $a$, as shown in Figs. 3 and 5, do not pass through the belt, but they afford the desired tensile union. The clinched teeth $b$ not only provide for tensile union, but also for such a firm connection with the belt as to render it practically impossible to separate them; but the tightening or shortening of a belt is readily accomplished at the end of the belt which is engaged by the non-clinchable teeth $a$. This fastener can obviously be so securely attached to a belt as to never be liable to be thrown therefrom should the belt break in rapid service, and it will be seen that only the clinchable teeth present metallic surfaces for contact with a pulley. It is immaterial how many teeth constitute a group, as two, three, or more can obviously be arranged with the intermediate or central non-clinchable tooth.

It is to be understood that the form of the clinchable and non-clinchable teeth may be varied indefinitely without departure from certain features of our present invention. In Fig. 20 we illustrate in cross-section eight forms of teeth (more or less) used by us, and although still other slightly-different forms have been used by us, those shown are known to be desirable. It is advisable that the teeth be rounded outwardly at their bases or junctions with the plate, not only because of their greater strength, but because the patterns therefore are more readily drawn from the sand in molding.

It is to be understood that while the fastener, Figs. 1 to 5, inclusive, is well adapted for general service, it is sometimes advisable to vary the arrangement of the clinchable teeth with reference to the non-clinchable teeth.

In Figs. 6 and 7 we show a fastener with one end of a belt applied thereto. The plate A and non-clinchable teeth $c$ are as before described, and the belt $d$ is forced upon one row of clinchable teeth $b$, causing them to pass through the belt, and thereafter the points of said teeth are turned downward into the belt; but in this case the non-clinchable teeth $c$ are located at the rear of the row of clinchable teeth, so as to occupy lines midway of each pair of clinchable teeth, thus providing for desired tensile union of the belt and fastener.

In Figs. 8 and 9 we show a plate, A, having clinchable teeth at each corner thereof, and a pair of non-clinchable teeth, one for each end of the belt, and each co-operates with the adjacent pair of clinchable teeth. It will be seen that the shanks of the clinchable teeth of the fastener last described stand in the belt, Fig. 9, at right angles to the plate, and that the tips only are bent. These teeth are equally beveled at their points, and they therefore drive straight; but said points are sufficiently long and slender to be readily turned to the one side or the other, as shown, without liability of bending or crippling the main portions or shanks of the teeth, which are embedded in the belt, even though a hammer be directly applied with a downward blow instead of the sidewise blow, heretofore necessary with equally-beveled teeth. This form of clinchable teeth may be successfully employed with the non-clinchable teeth in accordance with certain features of our present invention, and the fastener shown in Figs. 8 and 9 is well adapted for narrow high-speed belts, or several of them may be employed on one wide belt.

In Figs. 10 and 11 we illustrate a belt-fastener well adapted for use on high-speed wide belts on small pulleys, and having for each end of a belt a single row of teeth, and each row contains two pairs of clinchable teeth, $b$ and between the teeth of each pair is a shorter non-clinchable tooth c, and an additional non-clinchable tooth in each row is located centrally. In this fastener the points of each pair of clinchable teeth are turned toward each other and re-enter the belt, and the intervening portion of the latter is well condensed, because of the presence of the short teeth, which also contribute to the tensile union of plate and belt.

Figs. 16 to 19 are specially intended to illustrate the novel clinchable teeth for belt-fasteners as devised by us. As clearly indicated in Fig. 16, the teeth $b$ originally stand substantially rectangular to the rear surface of the plate A, and they are at their points unequally beveled, as at $b'$, upon that side of the tooth opposite to the direction in which it is desired they should bend in clinching, and upon the opposite sides said points may be either slightly beveled or substantially straight, as shown. The teeth are sharp at their points, so as to readily puncture a belt, and sufficient length of the beveled portion is provided to secure a return-bend of the points, so that the tips of the points will, when clinched, be housed or covered in the rear portion of a belt. In Fig. 17 a belt, $d$, is shown to be partially forced upon the teeth, which, having in this particular case the unequal bevel on opposite sides of the points, are thereby caused to incline or bend toward each other, thus giving them their initial curve or bend; but when beveled on their coincident sides they would of course be bent or inclined away from each other. In Fig. 18 the belt is forced upon the plate, as if care had been taken to not strike the teeth while so driving the belt, for illustrating how the points of the teeth are still farther inclined or bent toward each other, although in practice a hammer would usually be applied to the belt directly over and upon the teeth, causing them to at once assume the return-bend after getting well through the belt. When properly clinched, as shown in Fig. 19, it will be seen that the teeth present a minimum of exposed metallic surface at the rear of the belt, although they obviously afford such a union of fastener and belt as precludes separation, except by cutting away the belt from around the teeth. It will be seen that these teeth differ from all clinchable teeth as heretofore made, in that they are never, and cannot be, abruptly bent, and therefore they are never weakened, as is the case where a tooth is bent flatly at right angles upon the rear surface of the belt. It is desirable when the grouping of these teeth is involved that the groups occupy no more space than can well be covered by the face of a hammer of sufficient weight for properly applying the fasteners. With our improved clinchable teeth it will be seen that the clinching operation is performed by a square downward blow of the hammer, instead of requiring a sidewise blow, as heretofore, for abruptly bending the points flatwise upon the rear surface of the belt.

Having thus described our invention, we claim as new and desire to secure by Letters Patent—

1. In a belt-fastener, the combination, with a metallic plate, of a series of non-clinchable teeth for one end of a belt and a series of clinchable teeth for the other end of said belt, substantially as described.

2. In a belt-fastener, the combination, with a metallic plate, of clinchable teeth and non-clinchable teeth, substantially as described.

3. In a belt-fastener, the combination, with a metallic plate, of groups of clinchable teeth beveled unequally, with excess on the sides of the points opposite the centers of their respective groups, substantially as described, whereby, when forced into a belt, the teeth of each group will be inclined or bent toward the center of the group and their points assembled near said center, as set forth.

SIMEON BUDLONG.
WALTER O. TALCOTT.

Witnesses:
STEPHEN W. NICKERSON,
FRANK H. JACKSON.